United States Patent [19]

Maruyama

[11] Patent Number: 4,490,759
[45] Date of Patent: * Dec. 25, 1984

[54] ROTARY HEAD ASSEMBLY HAVING FLUID THRUST AND RADIAL BEARINGS

[75] Inventor: Teruo Maruyama, Osaka, Japan

[73] Assignee: Matsushita Electric Industrial Co., Ltd., Tokyo, Japan

[*] Notice: The portion of the term of this patent subsequent to Nov. 17, 1998 has been disclaimed.

[21] Appl. No.: 322,083

[22] Filed: Nov. 17, 1981

Related U.S. Application Data

[62] Division of Ser. No. 81,340, Oct. 3, 1979, Pat. No. 4,301,487.

[30] Foreign Application Priority Data

Oct. 16, 1978 [JP] Japan .................. 53-127535

[51] Int. Cl.³ .......................... G11B 5/52; G11B 21/04
[52] U.S. Cl. .................. 360/107; 360/130.24
[58] Field of Search .............................. 360/107–108, 360/102, 103, 84, 130.22–130.24

[56] References Cited

U.S. PATENT DOCUMENTS

| | | | |
|---|---|---|---|
| 3,981,024 | 9/1976 | Mo et al. | 360/102 X |
| 4,031,558 | 6/1977 | Kusaka | 360/108 X |
| 4,251,840 | 2/1981 | Maruyama et al. | 360/107 |
| 4,266,255 | 5/1981 | Camras | 360/130.24 X |
| 4,301,487 | 11/1981 | Maruyama | 360/107 |

FOREIGN PATENT DOCUMENTS

| | | | |
|---|---|---|---|
| 45-32032 | 10/1970 | Japan | 360/107 |
| 482803 | 12/1976 | U.S.S.R. | 360/107 |

Primary Examiner—John H. Wolff

[57] ABSTRACT

In a rotary head assembly for magnetic recording and reproducing apparatus such as VTR, fluid or hydraulic radial and thrust bearings are provided between a stationary sleeve whose one end is closed fluid-tightly and a rotary shaft rotatably extended into said stationary sleeve, whereby the rotary head assembly may be made compact in size and easy to assemble, may rotate with a higher degree of reliability and may completely seal lubricant.

4 Claims, 8 Drawing Figures

ROTARY HEAD ASSEMBLY HAVING FLUID THRUST AND RADIAL BEARINGS

RELATED APPLICATION

This application is a division of co-pending application Ser. No. 81,340 filed Oct. 3, 1979, now issued as U.S. Pat. No. 4,301,487.

BACKGROUND OF THE INVENTION

The present invention relates to a rotary head assembly for VTR, video tape recorder, in which a rotary cylinder must be rotated at high speeds with a higher degree of accuracy.

The most important function of the rotary head cylinders for VTR is to maintain correct speed and position relationship between a head and a tape and to reproduce this correct relationship at any time.

When the relative speed between the head and tape varies, the variations in time axis of reproduced signal result so that variations in color in the pictures and horizontal slipping of the picture occur. Therefore such variations must be minimized. More particularly, the rotary cylinder must be free from variations in rotational speed and from radial or lateral vibrations as much as possible.

In the prior art VTR head assemblies, the ball bearings are used to support the shaft of the rotary cylinder which carries the head so that the following problems arise. [1] Variations in torque are very sensitive to the volume of lubricant, for instance grease, and to the conditions under which the lubricant is sealed. When grease is sealed in a large quantity, the load varies over a wide range. On the other hand, when the quantity of sealed grease is small, wear accelerates. In addition, variations in torque are also caused by the undulations of the surfaces of the races of the ball bearings.

The recent trend of VTR rotary head assemblies is towards compactness. As a consequence the inertia effects of the rotary cylinder are reduced so that the variations in rotational speed tend to occur more frequently. [2] Vibration is caused mainly from poor surface finish of the balls and outer and inner races of ball bearings, elastic vibrations of the outer and inner races and gaps between mating parts. Radial or lateral vibrations cause the deviation of the axis of rotation of the rotary cylinder so that variations in rotational speed result and consequently complex and adverse effects on the reproduced pictures occur.

The above-described problems arise inevitably as far as the ball bearings are used. To overcome these problems, extensive studies and experiments have been made. For instance, in order to minimize the vibrations of the rotary cylinder, the dimensional accuracies of the ball bearings, housing and other parts are increased as much as possible, and the moment of inertia of the rotary shaft is increased as much as possible. However, because of the tendency to compactness in size of VTR, the rotary cylinders are also reduced in size so that the flywheel effects are reduced accordingly. As a result the vibrations of the ball bearings become more pronounced.

SUMMARY OF THE INVENTION

The present invention relates to a means for transmitting rotation which may be used in a rotary head assembly for VTR which has the problems described above.

According to the present invention, a rotary shaft is rotatably fitted into a stationary sleeve whose one end is securely and fluid-tightly attached to a base, and a fluid or hydraulic thrust bearing arrangement is provided in the closed end of the stationary sleeve so as to carry the thrust loads on the rotary shaft, whereby a rotary head assembly may be provided which is compact in size, simple in construction, and easy to mass produce.

BRIEF DESCRIPTION OF THE DRAWINGS

FIGS. 3 through 6a,b, are fragmentary longitudinal views in section, respectively, of other embodiments of the present invention.

Same reference numerals are used to designate similar or identical parts throughout the figures except FIG. 1.

CONCRETE DESCRIPTION OF THE PRIOR ART

Figure 1:
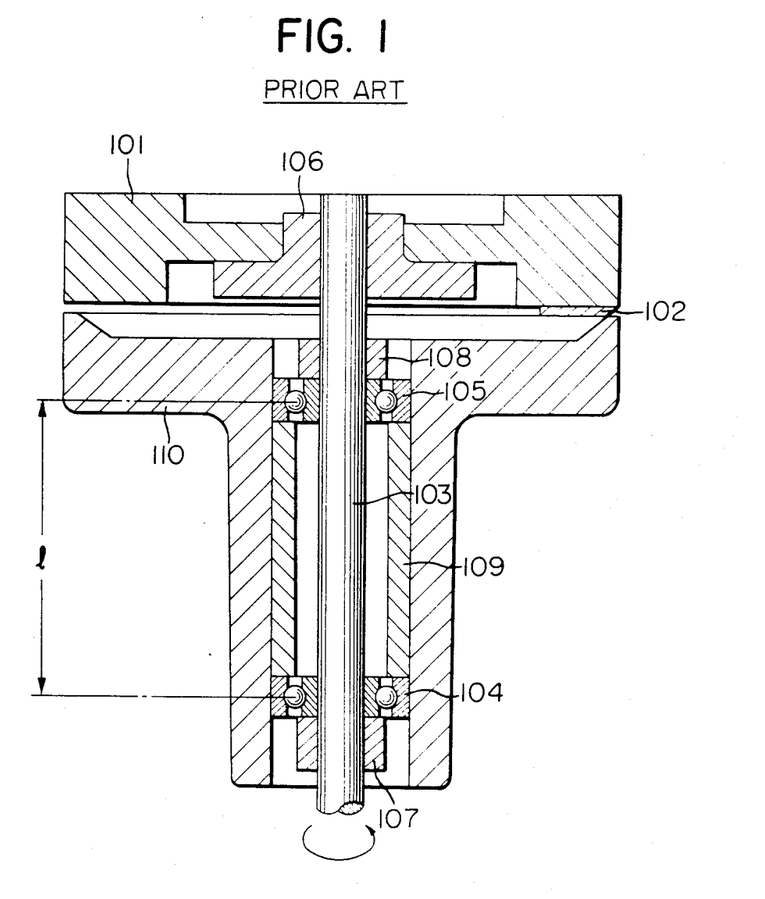
FIG. 1 is a longitudinal view in section of a prior art VTR rotary head assembly in which a rotary shaft is supported by ball bearings.

In FIG. 1 is shown a prior art VTR rotary head assembly having an upper cylinder or a rotary cylinder 101 which is rotated at 1800 rpm in the case of a two-head helical scanning type VTR and carries a head 102. A rotating shaft 103 of the upper cylinder 101 is supported by ball bearings 104 and 105 which are vertically spaced apart from each, other and carry both the radial and thrust loads. A bushing 106 is attached to the upper end of the shaft 103 and the upper cylinder 101 is mounted on the bushing 106. Sleeves 107, 108 and 109 are preloaded so as to eliminate the displacements in the axial direction of the bearings 104 and 105 which are mounted in a housing 110. The rotary head assembly with this construction has the problems described elsewhere.

DESCRIPTION OF THE PREFERRED EMBODIMENTS

Figure 2:
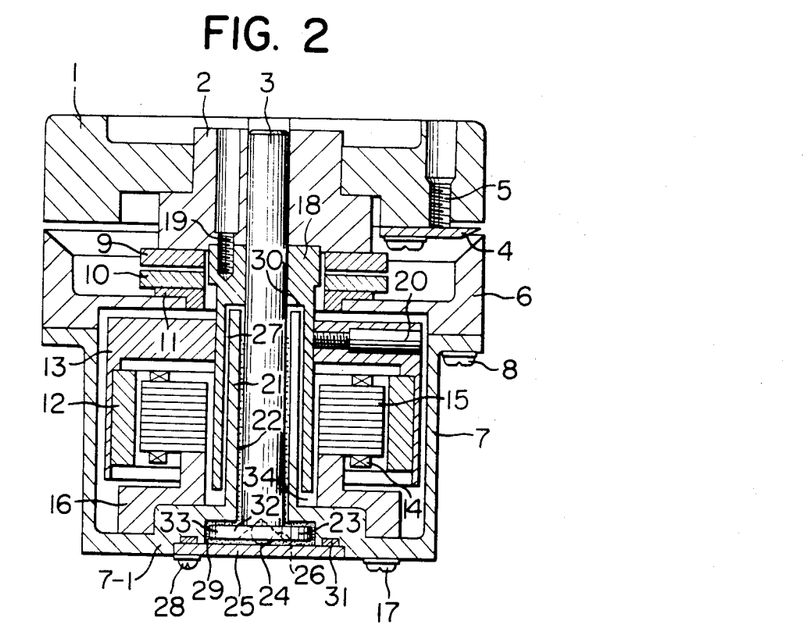
FIG. 2 is a longitudinal view in section of a first embodiment of a VTR rotary head assembly in accordance with the present invention.

In FIG. 2 is shown a first embodiment of the present invention applied to a VTR rotary head assembly. In general, the rotary head assembly may be divided into a rotary subassembly and a stationary subassembly. The rotary subassembly comprises a rotary shaft 3 with a flange 32 formed at the lower end, a bushing 2 fitted over the rotary shaft 3 and securely held in position at the upper end thereof, an upper cylinder or a rotary cylinder 1 removably fitted over the bushing 2 and having a head 4, which is mounted on the undersurface of the upper cylinder 1 and may be adjusted by tightening or loosening an adjusting screw 5, a rotary sleeve 18 which has an inverted U-shaped sectional configuration and is fitted over the rotary shaft 3 with the upper end rigidly joined with bolts 19 to the undersurface of the bushing 2, a magnet casing 13 which carries rotating magnets 12 and is mounted on the rotary sleeve 18 coaxially thereof and securely held in position with bolts 20 and a rotary part 9 of a rotary transformer which is mounted on the undersurface of the bushing 2 coaxially thereof.

The stationary subassembly comprises a housing 7 and a lower cylinder 6 securely mounted with bolts 8 on the housing 7 at the upper open end thereof. A stationary part 10 of the rotary transformer is mounted on and bonded to a mounting ring 11 on the radially inwardly extended flange of the lower cylinder 6 in opposed relationship with the rotary part 9.

The housing 7 has a cylindrical base 7-1 which is raised from the inner bottom surface coaxially of the housing 7 and formed with a cylindrical recess 33. Extended axially upwardly from the raised base 7-1 coaxially thereof is a stationay sleeve 21 whose outer diameter is slightly smaller than the inner diameter of the rotary sleeve 18 and whose inner diameter is slightly greater than the outer diameter of the rotary shaft 3 extended through the stationary sleeve 18.

A stator 15 with armature coils 14 is mounted radially outwardly of the rotating sleeve 18 in opposed relationship with the rotating magnets 12 on a motor base which in turn is mounted on the raised base 7-1 and is securely held in position with bolts 17. Thus the rotor consisting of the magnet casing 13 carrying the rotating magnets 12 and the stator 15 constitutes a driving means which rotates the shaft 3 and hence the upper head 1.

After the assembly, a cylindrical space 27 is defined between the rotating sleeve 18 and the stationary sleeve 21, and another cylindrical space is defined between the rotary shaft 3 and the stationary sleeve 21 and filled with a lubricating oil 29. The spaces between the cylindrical recess 33 and the flange 32 at the lower end of the rotary shaft 3 is also filled with the lubricating oil 29. The cylindrical recess 33 is closed with a cover 25 attached to the housing 7 with bolts 28. An O-ring 31 is interposed between the housing 7 and the cover 25. The lubricating material may be air in place of the oil 29.

The lower end of the rotary shaft 3 is supported on the cover 25 by a pivot bearing 24 consisting of a hard ceramic ball fitted between the cover 25 and a conical recess 26 formed in the bottom surface of the flange 32 coaxially thereof.

The rotary head assembly with the above-described construction is therefore provided not only with a hydraulic thrust bearing arrangement 23 comprising the cylindrical recess 33 and the pivot bearing 24 but also with a hydraulic radial bearing arrangement 22 comprising the stationary sleeve 21 and the portion of the rotary shaft between the upper surface of the flange 32 and the upper end 30 of the stationary sleeve 21. The hydraulic thrust and radial bearing arrangements 23 and 22 carry the radial and thrust loads of the rotary shaft 3.

One of the important features of the present invention resides in the fact that there is provided a double-sleeve construction. That is, the rotary shaft 3 is extended through the stationary sleeve 21 which in turn is extended into the rotating sleeve 18.

Another important feature resides in the fact that the driving motor is disposed radially outwardly of the hydraulic radial bearing arrangement 22 which is defined by the stationary sleeve 21 and the rotary shaft 3. The rotary head assembly to which is applied the present invention has the following features and effects.

[1] Rotation with high accuracies:

Except the pivot bearing 24 which provides a point contact, the rotary shaft 3 rotates within the stationary sleeve 21 without any mechanical contact therewith. During the rotation, the surrounding wall surfaces (rotary shaft 3) move relative to the inner wall of the stationary sleeve 21, so that when the rotary shaft 3 is off-centered, the pressure which balances with the load is generated by the wedge effect of the lubricating oil film sealed between the stationary and moving walls, whereby rotation with extreme high accuracies may be maintained.

In VTR, when the upper cylinder 1 is caused to oscillate or vibrate in the radial directions, the variations in relative speed between the tape and the upper cylinder result, so that jitter of pictures occurs. Thus it is imperative to eliminate the radial vibrations of the upper cylinder 1 as much as possible. When a rotating member is driven by a direct drive motor or the like, the following factors cause the radial or lateral vibrations of the rotating member.

(1) Variations in magnetization of magnets arranged circumferentially.

(2) Dynamic unbalance due to the nonuniform distribution of the mass of the rotating part of the motor; that is, the rotor magnet 12 and the magnet casing 13.

(3) Misalignment between the rotating and stationary parts; that is, the armature coil 14 and stator 15.

The degrees of effects of the above factors (1), (2) and (3) on the radial or lateral vibrations of the rotating member are very closely correlated with the supporting means of the bearings which support the rotating member.

In general, the rotating member wherein the parmanent magnets of the direct drive (DD) motor are arranged circumferentially, is large in diameter and heavy in weight so that it exhibits considerable flywheel effect. Thus the above-described factors (1), (2) and (3) are the main causes for radial or lateral vibrations.

The embodiment shown in FIG. 2 is featured in the fact that the hydraulic radial bearing arrangement 22 is provided immediately radially inwardly of the inner walls of the rotor magnet 12 and magnet casing 13. As a result, the variations in load due to the above-described factors (1), (2) and (b 3) may be carried directly by the inner surfaces of the stationary sleeve 21. Therefore the moment load which tends to incline the axis of the rotary shaft 3 will not act on the hydraulic radial bearing arrangement 22. Thus, the rotation which exhibits excellent dynamic balance and is almost free from the radial or lateral vibrations may be ensured.

[2] Compactness:

Referring back to FIG. 1, there are three arrangements of the motor.

(1) The motor is disposed above the ball bearing 105.

(2) The motor is mounted between the ball bearings 104 and 105.

(3) The motor is mounted below the ball bearing 104.

The distance l between the ball bearings 104 and 105 must be such that the rigidity of the cylinder may be maintained sufficiently. Therefore when the motor is mounted above the ball bearing 105 or below the ball bearing 104, the length of the cylinder must be equal at least to the sum of the distance l and the length of the motor mounted. (For instance, in the prior art rotary head assemblies, the distance l is between 40 and 50 mm.) The construction and assembly for permitting the mounting of the motor between the ball bearings 104 and 105 are very difficult and not feasible without causing the misalignment between the ball bearings 104 and 105.

On the other hand, in the apparatus shown in FIG. 2, even when two sleeves are used, the outer diameter of the rotating sleeve 18 may be reduced considerably, so that the hydraulic radial bearing arrangement 22 may be provided at the position which corresponds to the inner walls of the motor and consequently the distance l which is not useful is not needed. As a result, the rotary head assembly may be made very compact in size. In addition, when the upper cylinder 1, the lower cylinder 6, the rotary part 9 of the rotary transformer, the stationary part 10 of the rotary transformer, and the head 4 are machined with required dimensional accuracies, the assembly may be much facilitated. That is, the rotary sleeve 18 to which is joined the magnet casing 13 is fitted over the stationary sleeve 21, and then the lower cylinder 6 is mounted.

When these parts are machined with desired degree of accuracies, the axis of the rotary shaft 3 may exactly coincide with the axis of the stationary sleeve 21 by the hydraulic lubrication during the rotation. As a result, additional machining and adjustment for attaining the alignment between the roll bearings and rotary shaft may be eliminated. In addition, as shown in FIG. 2, the hydraulic thrust bearing arrangement 23 which restrains the movement in the axial direction is provided by utilizing the space in which the stator is mounted at the sealed end of the stationary sleeve 21.

The VTR rotary head assembly must be provided with a means which limits the axial displacement of the rotary subassembly consisting of 1, 2, 3, 12, 13 and 18 so that the head 5 may be maintained at a correct axial position. When the apparatus is used only at an upright position, the flange 32 of the rotary shaft 3 may be eliminated and instead a spherical surface bearing which provides a point contact may be formed at the lower end of the rotary shaft 3 so that the weight of the rotary subassembly may be used for limiting the displacement in the axial direction. However, a portable cylinder is used at a horizontal position so that the restriction in the axial direction cannot be attained. Furthermore the thrust bearing is needed which may hydraulically restrict the axial displacement of the rotary subassembly, so that the head 4 may be maintained at a correct axial position even when impulses or the like are exerted thereto from the exterior. According to the present invention, the flange 32 of the rotary shaft 3 which is greater in diameter than the rotary shaft 3 and defines the hydraulic thrust bearing arrangement 23 is disposed in the portion for mounting the stator 15, that is, the portion below the stator mounting base 16 which is not used otherwise or is a dead space. As a result the rotary head assembly may be made compact in size.

At present, the height of VTR is dependent upon the height of the rotary head assembly, but when the rotary head assemblies of the present invention are used, the height of VTR may be considerably reduced. For instance, ratio in length between the prior art rotary head assembly and the rotary head assembly in accordance with the present invention both carrying the similar motors is 1.0:0.57.

[3] Excellent Sealing Performance:

The embodiment shown in FIG. 2 may exhibit excellent sealing performances for a long time. That is, the leakage of the lubricating oil may be avoided.

In the case of the machine tools or the like, the lubrication oil may be replaced or supplemented at any time, but in case of the electronic equipment such as home VTR, the rotary head assembly must be so designed and constructed as to completely seal its lubricating oil, thereby eliminating the need for supplementing the lubricating oil.

In the case of the VTR rotary head assembly, the contamination of the component parts by the lubricating oil must be avoided completely. For instance, when the head 4 and the tape are contaminated with the lubricating oil, dust or the like adhere to them, so that the head 4 cannot record or reproduce the video signal correctly.

One result is partial missing of FM carrier, resulting in drop-out noise.

However, according to the embodiment shown in FIG. 2 and embodying the present invention, the complete sealing of lubricating oil may be attained because of the following reasons so that the contamination of the component parts may be avoided.

(1) One end (lower end in FIG. 2) of the stationary sleeve 21 is completely sealed. That is, according to the rotary head assembly of the present invention, the lower end of the stationary sleeve 21 in which are housed the hydraulic radial and thrust bearing arrangements 22 and 23 and in which is filled the lubricating oil 29 is completely sealed with the cover 25 and the oil seal or O-ring 31. (2) The double-sleeve construction is provided. In the embodiment shown in FIG. 2, the rotating sleeve 18 is fitted over the stationary sleeve 21, and the leakage of the lubricating oil 29 may be prevented by the high fluid resistance and surface tension in the space 27 between the stationary and rotary sleeves 21 and 18. When the surrounding temperature rises, the lubricating oil 29 filled in the stationary sleeve 21 is expanded thermally, only a very small amount of lubricating oil 29 flows into the space 27 and the leakage to the exterior may be completely avoided. Even though the double-sleeve construction is provided, an opening may be provided at the bottom portion of the apparatus. That is, the opening 34 of the rotary sleeve 18 is located at the bottom of the stator 15 of the motor in the embodiment shown in FIG. 2 and is spaced apart by a sufficient distance from the head 4 and the upper cylinder 1 whose contamination with the lubricating oil 29 must be avoided by all means. In addition, it is easy to form an oil reservoir adjacent to the opening 34 of the rotary sleeve 18.

In the experiments conducted by the inventors a low-viscosity, ester series lubricating oil (15 cm-stoke) was used. Even after continuous rotation for 2000 hours, only mist-like traces were observed adjacent to the opening 34 of the rotary sleeve 18. In practice the leakage in such extremely small quantity may be negligible.

Next another embodiment of the present invention will be described. The embodiment shown in FIG. 3 has a double sleeve construction as with the embodiment shown in FIG. 2. Oil grooves 35 are formed in the inner surface of the rotating sleeve 18 and the outer surface of the stationary sleeve 21, the opposing surface being moved relative to each other. The provision of such oil grooves 35 serves to prevent the leakage of the lubricating oil. 22 is the hydraulic radial bearing arrangement.

Figure 3:
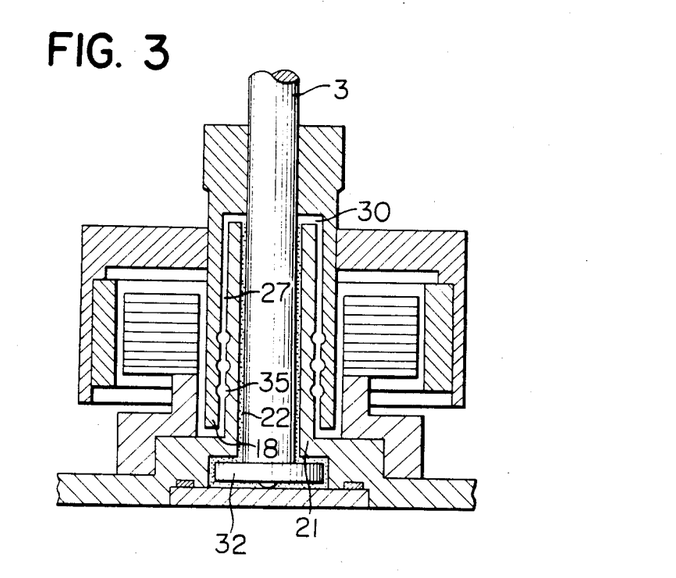

In the embodiment shown in FIG. 3, when the clearance between the rotary and stationary sleeves 18 and 21 is 0.1 mm, the provision of the oil grooves with the radius of 0.5 mm may attain satisfactory effects.

Instead of forming the oil grooves 35 in the relatively moving surfaces of the rotary and stationary sleeves 18 and 21, the relatively moving surfaces may be formed with visco-seal (spiral grooves) which causes the lubricating oil 29 leakaging into the space 27 to flow upwards.

Figure 4:
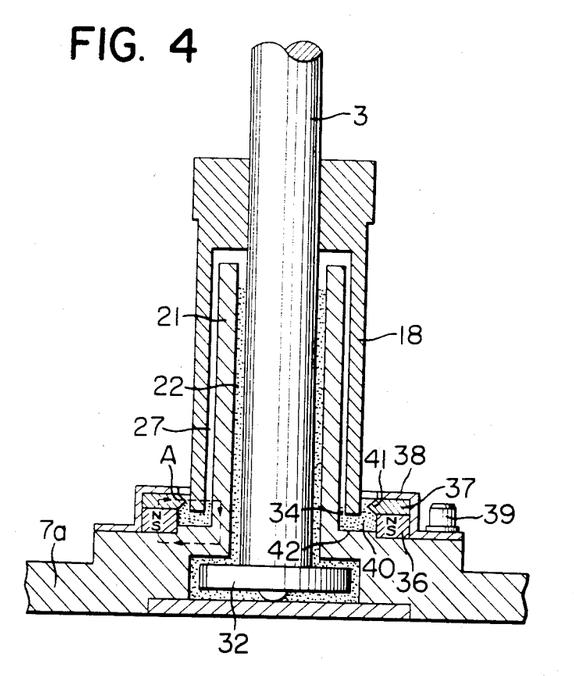

The embodiment shown in FIG. 4 has also a double sleeve construction. In order to attain more effective containment or sealing of the lubricating oil 29, a magnetic liquid or magnetic lubricating liquid is used so as to attain a magnetic seal.

That is, 36 is a permanent magnet; 37, a yoke; 38, a magnet sealing case; 39, mounting bolts; 40, a magnetic liquid; 41, a projection; and 42, a magnetic liquid tank. The magnetic liquid 40 is sealed in the magnetic liquid tank 42 formed adjacent to the opening 34 of the rotary sleeve 18.

The leading edge of the yoke 37 is pointed as indicated by 41 so as to attain the magnetic concentration. The magnetic liquid 40 is trapped at the pointed edge 41 by the following magnetic circuit A, so that the magnetic seal may be attained. That is, the magnetic circuit A follows the path from the north pole of the permanent magnet 36, the rotary sleeve 18, the stationary sleeve 21, the hydraulic radial bearing arrangement 22, the lower housing 7 to the south pole of the permanent magnet 36. 7a is the lower cylinder and 27 is the space between the rotary and stationary sleeves 18 and 21. The magnetic liquid 40 which is used in the embodiment shown in FIG. 4 has both the fluidity inherent to the liquid and the magnetic properties as a magnetic body made of an alloy (solid body) of iron, nickel ferrite or the like.

In the embodiment of the present invention, magnetite (FeO Fe$_2$O$_3$) which is one kind or type of ferrite is finely divided into particles of about 100 Å in diameter and dispersed in a solvent with the aid of a surface active agent.

As described above, the magnetic liquid 40 may be filled only adjacent to the magnetic fluid tank 42 only for the purpose of sealing, but a magnetic lubricating oil synthesized of base oils such as ester oil having excellent lubricating effects may be used to lubricate the hydraulic radial and thrust bearing arrangments 22 and 23.

In the latter case, it is not needed to previously seal the magnetic liquid 40 into the magnetic liquid tank 42, and in order to prevent the leakage to the exterior of the magnetic liquid 40 which has flown through the space 27, there may be provided as a magnetic seal arrangement the permanent magnet 36, the yoke 37, the casing 38 and mounting bolts 39.

In the embodiment shown in FIG. 4, the positive closed loop, magnetic circuit A is provided by the combination of the permanent magnet 36, the yoke 37 and so on. In the apparatus in accordance with the present invention, the complete seal effects are already attained by the effects of fluid resistance and surface tension in the space 39 so that when the apparatus is always maintained in an upright position, the complete leakage prevention effects has been recognized by the provision of one permanent magnet at the opening 34.

Figure 5:
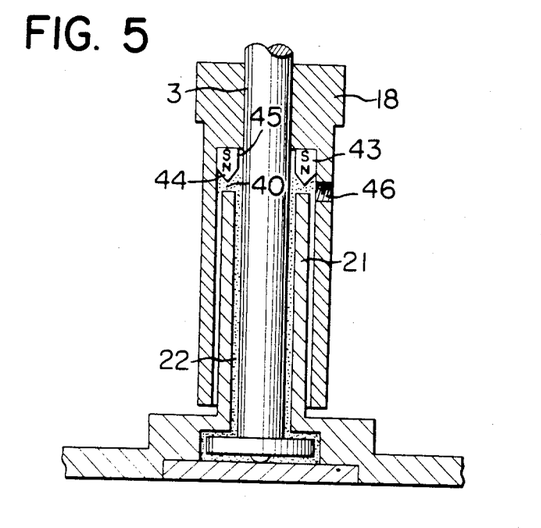

FIG. 5 shows a still further embodiment of the present invention. It is an example of using a magnetic seal so as to prevent the leakage of the lubricating oil.

43 is a permanent magnet; 44 is a pointed edge in opposed relationship with the annular upper end face of the stationary sleeve 21. In the case of FIG. 5, the rotary sleeve 18 uses aluminum which is nonmagnetic while the stationary sleeve 21 uses steel which is magnetic.

And between the permanent magnet 43 which has the pointed edge 44 which is magnetized in the axial direction and the rotary shaft 3 is provided a gap 45 (clearance being of the order of 1 mm), and between the pointed edge 44 and the annular upper end face of the stationary sleeve 21 is provided a gap with a clearance of 0.5 mm. The permanent magnet 43 is radially outwardly spaced apart from the rotary shaft 3 by 1 mm while the pointed edge 44 of the magnet 43 is spaced apart from the annular upper end face of the stationary sleeve 21 by 0.5 mm. The satisfactory effects may be attained with this embodiment.

Meanwhile the permanent magnet 43 uses a flexible magnet which is a composite material of rubber and barium ferrite so that the machine may be facilitated.

When a tapped portion 46 for sealing a magnetic fluid is formed through the rotary sleeve in the construction shown in FIG. 5, the hydraulic bearing construction may be provided in which the magnetic liquid 40 is used only adjacent to the magnetic seal while others uses oil which is nonmagnetic. That is, after the nonmagnetic lubricating oil has been filled only into a hydraulic bearing oil film portion 26 (the oil film portion of the radial-thrust bearing between the stationary sleeve 21 and the rotary shaft 3), a predetermined volume of magnetic fluid 40 which will not mix with said lubricating oil is filled through the tapped portion 46 and then sealed with the tapped portion.

In FIG. 6(a) is shown a yet another embodiment of the present invention wherein the hydraulic radial bearing arrangement 22 is provided with a spiral groove bearing to be described in detail below.

The accurate rotation (or stability) of the hydraulic bearing is adversely affected by oil whirls. When oil whirls occur in a VTR rotary head assembly in which the upper cylinder is supported by the hydraulic bearing arrangement and is rotated at for instance 1800 rpm variations in rotational speed and radial or lateral vibrations result. The frequency of speed variations and radial or lateral vibrations is dependent the rotational speed of the cylinder and is for instance 15 Hertz (=30/2 Hertz). When the rotary shaft 3 is formed with spiral grooves, oil whirls may be suppressed by the pressure generated by the pumping action of the spiral grooves 47 on the surface of the shaft 3.

More particularly, the outer surface of the rotary shaft 3 which defines the hydraulic radial bearing arrangement 22 is formed with spiral grooves by for instance etching. With no load (without eccentricity), the pressure produced by the pumping action of the spiral grooves 47 is distributed as shown in FIG. 6(b), the maximum pressure being produced at the midpoint of the hydraulic radial bearing arrangement 22 which is contained in a plane which also contains the imaginary center of the rotor of the motor.

In addition to the spiral grooves 47, other radial noncircular bearings may be equally used in the present invention in order to avoid oil whirls. They are for instance multi-arc type, floating bush type, Mackenzen type, Mitchel type and so on.

The thrust bearing arrangement 23 may be also formed with spiral grooves or ridges. More particularly, the upper, lower and peripheral surfaces of the flange 32 of the rotary shaft 3 may be formed with spiral grooves or ridges. Alternatively, the bottom surface of the flange 32 may be stepped or may be in the form of a cone.

Figure 6:
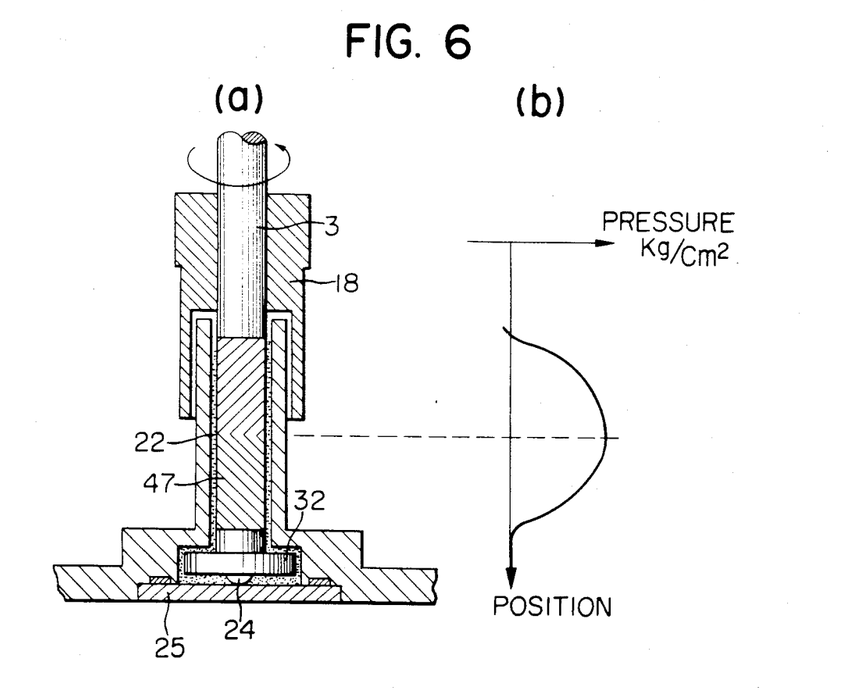

When the lubricating oil has a relatively high viscosity so that no leakage problem occurs, the length of the rotating sleeve 18 which is fitted over the stationary sleeve 21 may be shortened as shown in FIG. 6.

Figure 7:
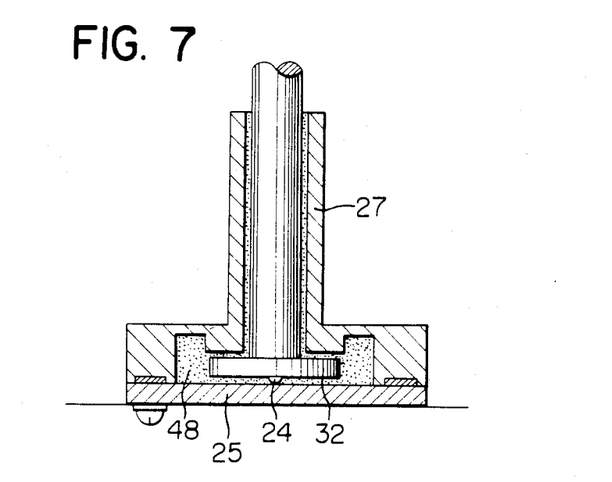

In FIG. 7 is shown a sixth embodiment of the present invention which is substantially similar in construction to the first embodiment shown in FIG. 1 except that the recess 33 formed in the raised base 17-1 of the stationary sleeve 21 is enlarged radially outwardly so that an annular oil reservoir 48 may be defined around the flange 32 of the rotary shaft 3. As compared with the first embodiment, a relatively large quantity of lubricating oil may be contained in the hydraulic thrust bearing arrangement 23. The oil reservoir 48 may be provided in the dead space without causing any extension of the rotary head assembly.

So far the rotor of the motor has been described as being directly mounted on the rotary shaft 3, but it is to be understood that the present invention may be equally applied to the rotary cylinder assembly of the type wherein a motor is disposed exterior of the assembly and drivingly coupled to the rotary shaft through a belt and pulley transmission system. In this case, it is preferable to mount a driven pulley and an electromagnetic brake for controlling the rotational speed on the rotary sleeve at the midpoint thereof so that no moment load may be exerted to the hydraulic radial bearing arrangement 22 and the eccentric displacement of the rotary shaft may be eliminated as much as possible. Even when the belt and pulley drive is employed, the rotary head assembly may be made compact in size.

What is claimed is:

1. A rotary head assembly, comprising:
   (a) a stationary sleeve having one end securely fixed to a base;
   (b) a rotary shaft coaxial with and rotatably extended through said stationary sleeve, leaving a cylindrical space therebetween and contained within said base;
   (c) a rotary sleeve coaxial with and radially surrounding said stationary sleeve, leaving a cylindrical space therebetween, said cylindrical spaces communicating with each other, said rotary shaft extending through said rotary sleeve and being fixed thereto;
   (d) a stationary cylinder securely mounted on said base coaxially of said stationary sleeve;
   (e) a rotary cylinder which has the same outer diameter as that of said stationary cylinder and is mounted securely on said rotary shaft adjacent to said stationary cylinder and axially spaced apart from said stationary cylinder by a predetermined distance;
   (f) a means for driving said rotary cylinder;
   (g) a head securely mounted on said rotary cylinder for sliding contact with a tape which is wrapped and transported around the cylindrical surfaces of said stationary and rotary cylinders; and
   (h) a lubricating fluid filled into the space between said stationary sleeve and said rotary shaft, and the space between said stationary sleeve and said rotary sleeve, thereby forming a bearing fluid film portion consisting of
      (i) a thrust bearing portion which is defined by a flange which is secured to or formed integral with said rotary shaft and has a diameter greater than that of said rotary shaft and the wall surfaces of said stationary sleeve, said flange having a surface adjacent a supporting portion of said base, said surface having a conical recess therein coaxial with said rotary shaft, a pivot bearing being captured in said conical recess and contiguous with said supporting portion of said base,
      (ii) seal means to preclude leakage of said lubricating fluid, and
      (iii) a radial bearing portion defined by said cylindrical spaces and said fluid, said driving means being mounted exterior of said radial bearing portion.

2. A rotary head assembly, comprising:
   (a) a stationary sleeve having one end securely fixed to a base;
   (b) a rotary shaft coaxial with and rotatably extended through said stationary sleeve, leaving a cylindrical space therebetween and contained within said base;
   (c) a stationary cylinder securely mounted on said base coaxially of said stationary sleeve;
   (d) a rotary cylinder which has the same outer diameter as that of said stationary cylinder and is mounted securely on said rotary shaft adjacent to said stationary cylinder and axially spaced apart from said stationary cylinder by a predetermined distance;
   (e) a means for driving said rotary cylinder;
   (f) a transducer head securely mounted on said rotary cylinder; and
   (g) a lubricating fluid filled into the space between said stationary sleeve and said rotary shaft, thereby forming a bearing fluid film portion consisting of
      (i) a thrust bearing portion defined by a flange secured to or formed integral with said rotary shaft and having a diameter greater than that of said rotary shaft and the wall surfaces of said stationary sleeve, said flange having a surface adjacent a supporting portion of said base, said surface having a conical recess therein coaxial with said rotary shaft, a pivot bearing being captured in said conical recess and contiguous with said supporting portion of said base;
      (ii) seal means to preclude leakage of said lubricating fluid, and
      (iii) a radial bearing portion defined by said space between said stationary sleeve and said rotary shaft and said fluid, said driving means being mounted exterior of said radial bearing portion.

3. A rotary head assembly, comprising:
   (a) a stationary sleeve having one end securely fixed to a base;
   (b) a rotary shaft coaxial with and rotatably extended through said stationary sleeve, leaving a cylindrical space therebetween and contained within said base;
   (c) a stationary cylinder securely mounted on said base coaxially of said stationary sleeve;
   (d) a rotary cylinder which has the same outer diameter as that of said stationary cylinder and is mounted securely on said rotary shaft adjacent to said stationary cylinder and axially spaced apart from said stationary cylinder by a predetermined distance;
   (e) a means for driving said rotary cylinder;
   (f) a transducer head securely mounted on said rotary cylinder; and
   (g) a lubricating fluid filled into the space between said stationary sleeve and said rotary shaft, thereby forming a bearing fluid film portion consisting of
      (i) a thrust bearing portion defined by a flange secured to or formed integral with said rotary shaft at the free end portion of said rotary shaft and having a diameter greater than that of said rotary shaft and the wall surfaces of said stationary sleeve, said flange being contained in a cylindrical recess in a cylindrical base raised coaxially from the inner bottom surface of a housing supporting said stationary cylinder coaxially and having a surface adjacent a supporting portion of said base, said surface having a conical recess therein coaxial with said rotary shaft, a pivot bearing being captured in said conical recess and contiguous with said supporting portion of said base;

(ii) seal means to preclude leakage of said lubricating fluid comprising a cover detachably secured to said cylindrical base over said cylindrical recess, and (iii) a radial bearing portion defined by said space between said stationary sleeve and said rotary shaft and said fluid, said driving means being mounted exterior of said radial bearing portion.

4. The rotary head assembly according to claim 1, 2 or 3, wherein said means for driving said rotary cylinder comprises a motor having a rotor secured to said rotary cylinder and a stator secured to said base, the inner surface of said stator defining a part of said radial bearing portion, said thrust bearing being defined by said flange and a supporting portion of said base under said motor.

* * * * *